(12) United States Patent
Bezryadin

(10) Patent No.: US 7,990,392 B2
(45) Date of Patent: Aug. 2, 2011

(54) WHITE BALANCING THAT USES VALUES OF WHITE-BALANCED COLORS ON THE VISIBLE GAMUT'S BOUNDARY

(75) Inventor: Sergey N. Bezryadin, San Francisco, CA (US)

(73) Assignee: KWE International, Inc., South San Francisco, CA (US)

(*) Notice: Subject to any disclaimer, the term of this patent is extended or adjusted under 35 U.S.C. 154(b) by 838 days.

(21) Appl. No.: 11/971,701

(22) Filed: Jan. 9, 2008

(65) Prior Publication Data
US 2009/0174719 A1 Jul. 9, 2009

(51) Int. Cl.
*G09G 3/30* (2006.01)
*G09G 5/00* (2006.01)
*G09G 5/02* (2006.01)
*G06K 9/40* (2006.01)
*H04N 9/73* (2006.01)
*H04N 5/21* (2006.01)
*H04N 1/46* (2006.01)
*H04N 5/202* (2006.01)
*G03F 3/08* (2006.01)
*G06K 9/00* (2006.01)
*G06K 9/32* (2006.01)

(52) U.S. Cl. ........ 345/581; 345/590; 345/426; 345/606; 345/77; 348/223.1; 348/254; 348/630; 348/655; 358/516; 358/518; 358/519; 358/525; 382/300; 382/167; 382/254; 382/274

(58) Field of Classification Search .................. 345/426, 345/428, 581, 589, 590, 600–601, 606, 618, 345/593, 597, 610–611, 643, 690, 22, 63, 345/77, 88–89, 592; 348/253–254, 557, 348/630, 655, 671, 223.1, 225.1, 227.1, 602; 358/516–518, 519, 525; 382/162–167, 254, 382/274, 276, 300
See application file for complete search history.

(56) References Cited

U.S. PATENT DOCUMENTS

| | | | |
|---|---|---|---|
| 5,740,076 A * | 4/1998 | Lindbloom | 345/590 |
| 2003/0020727 A1* | 1/2003 | Newman | 345/604 |
| 2007/0097389 A1* | 5/2007 | Morovic | 358/1.9 |
| 2007/0146745 A1 | 6/2007 | Bezryadin | |
| 2007/0177175 A1* | 8/2007 | Matsuoka | 358/1.9 |
| 2007/0188780 A1* | 8/2007 | Edge | 358/1.9 |
| 2007/0216776 A1 | 9/2007 | Woolfe | |
| 2007/0236761 A1* | 10/2007 | Sloan | 358/520 |
| 2007/0279658 A1 * 12/2007 Ito et al. | | | 358/1.9 |

OTHER PUBLICATIONS

Akyuz, Ahmet Oguz; Reinhard, Erik, "Color Appearance in High-Dynamic-Range Imaging" Journal of Electronic Imaging 15(3), 033001 (Jul.-Sep. 2006), pp. 1-12.
Xiao, Feng; Farrell, Joyce E; DiCarlo, Jeffrey; Wandell, Brian A. "Preferred Color Spaces for White Balancing" Proceedings of SPIE-IS&T Electronic Imaging, SPIE vol. 5017 (2003), pp. 342-350.
Fairchild, Mark D. "Color Appearance Models: CIECAM02 and Beyond" IS&T/SID 12$^{th}$ Color Imaging Conference—Tutorial T1A, Nov. 9, 2004.
"Modern Color Models," http://www.handprint.com/HP/WCL/color7.html, Aug. 1, 2005, Bruce MacEvoy, pp. 1-78.

* cited by examiner

*Primary Examiner* — Wesner Sajous
(74) *Attorney, Agent, or Firm* — Michael Shenker; Haynes and Boone, LLP

(57) ABSTRACT

White balancing is performed using a mapping that maps the visible gamut's boundary into itself. A predefined color $W_{in}$ is mapped into a color $W_{out}$ which is a white color or a color perceived as white under some viewing conditions. If $S_{in}$ is some other color, a corresponding color $P_{in}$ is determined on the visible gamut's boundary. $P_{in}$ can be on the intersection of the visible gamut's boundary with a plane containing $S_{in}$ and $W_{in}$ in a linear color coordinate system. $S_{in}$ is mapped into a color $S_{out}$ obtained from $W_{out}$ and a value of the mapping on $P_{in}$.

29 Claims, 2 Drawing Sheets

WHITE BALANCING THAT USES VALUES OF WHITE-BALANCED COLORS ON THE VISIBLE GAMUT'S BOUNDARY

BACKGROUND OF THE INVENTION

The present invention relates to digital image processing, and more particularly to color transformations of the kind typically associated with white balancing.

Images are affected by image viewing conditions, e.g. by background and surrounding colors and illumination. However, humans can adapt to the viewing conditions, and it may be desirable to adjust the digital representation of the image in accordance with human adaptation. For example, if a scene is illuminated by a red lamp, the scene may acquire a reddish tint. An object that would reflect white light under white illumination may reflect reddish light under red illumination and may look reddish. However, humans adapt to the red illumination and may stop noticing the reddish tint. If the image is faithfully captured by a digital camera, the reddish tint would be captured, and would be reproduced when the image is displayed with a printer or a computer monitor. If the reproduced image is viewed under white illumination, the viewer would notice the reddish tint because the white illumination would not allow the viewer to adapt to the tint. Therefore, it may desirable to remove the reddish tint from the reproduced image so that the viewer's perception of the reproduced image would approach the viewer's perception of the original image.

Human adaptation can be modeled by a "white balancing" process which transforms image colors using a linear transformation chosen based on human adaptation to a white color. Suppose for example that the scene illumination or some other viewing conditions change a white color W to some color $W_{new}$ ($W_{new}$ would be reddish in the red-lamp example above). Supposedly, humans would adapt to the viewing conditions and would perceive the color $W_{new}$ as W. Therefore, a linear transformation is chosen that maps the color $W_{new}$ into W. Then another linear transformation may be performed that would change W into a color that would be perceived as W under the viewing conditions of the reproduced image.

SUMMARY

This section summarizes some features of the invention. Other features are described in the subsequent sections. The invention is defined by the appended claims, which are incorporated into this section by reference.

The inventor has observed that a linear transformation may map a color into a region outside of the visible gamut. Also, the inventor has observed that human adaptation is not linear. For example, humans do not seem to adapt to at least some of the colors located on the visible gamut's boundary (some of such colors can be generated by monochromatic radiation; the boundary also includes other colors, e.g. purple).

In some embodiments of the present invention, a white balancing process maps the visible gamut boundary into itself. (The terms "mapping" and "transformation" are used interchangeably herein.) For example, each color on the visible gamut's boundary can be mapped into itself. In addition, as in prior art, some chosen color $W_{new}$ is mapped into a white color W (alternatively W may be a non-white color perceived as white under some viewing conditions; $W_{new}$ may or may not be white). Any multiple $\alpha W_{new}$ of the color $W_{new}$ is mapped into a multiple of W. The remaining colors (i.e. colors that are not on the visible gamut's boundary and are not multiples of $W_{new}$) are mapped using some interpolation based on the mapping of the colors on the visible gamut's boundary and $W_{new}$.

To illustrate some embodiments, we will use the subscript "in" for the starting colors (the input colors of the white-balancing process), and the subscript "out" for the output colors. Accordingly, we will denote $W_{in}=W_{new}$, and $W_{out}=W$. The process maps $W_{in}$ into $W_{out}$, and maps each color $P_{in}$ on the visible gamut's boundary into a color $P_{out}$ on the visible gamut's boundary. (In some embodiments, $P_{out}=P_{in}$.) For the remaining colors $S_{in}$, some interpolation is used to determine the corresponding colors $S_{out}$. More particularly, suppose that $S_{in}$ can be represented as some function (e.g. a linear combination) of the color $W_{in}$ and some color $P_{in}$ on the visible gamut's boundary. Then $S_{out}$ is generated as some function (e.g. a linear combination) of $W_{out}$ and the respective color $P_{out}$ (i.e. the value of the mapping on $P_{in}$). In some embodiments, the functions are chosen so that $S_{out}$ is in the visible gamut.

The invention is not limited to the features and advantages described above. Other features are described below. The invention is defined by the appended claims.

DESCRIPTION OF SOME EMBODIMENTS

The embodiments described in this section illustrate but do not limit the invention. The invention is defined by the appended claims.

Figure 1:
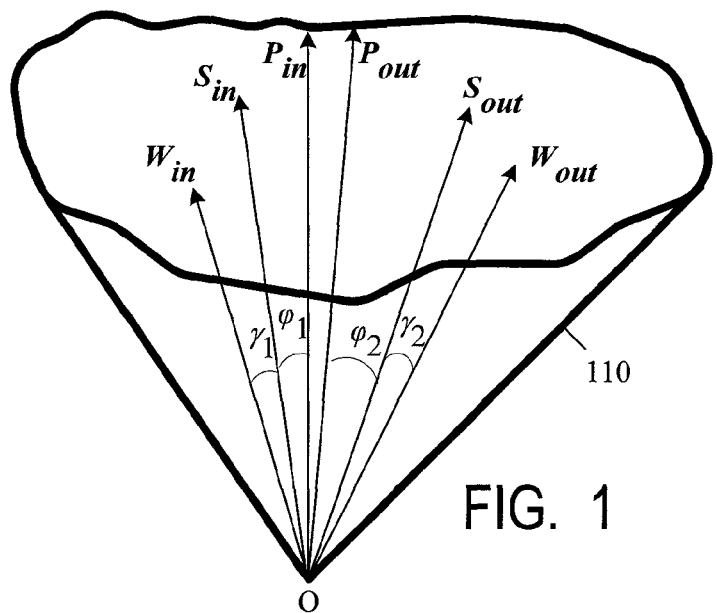
FIG. 1 illustrates color vectors for some embodiments of the present invention.
Figure 2:
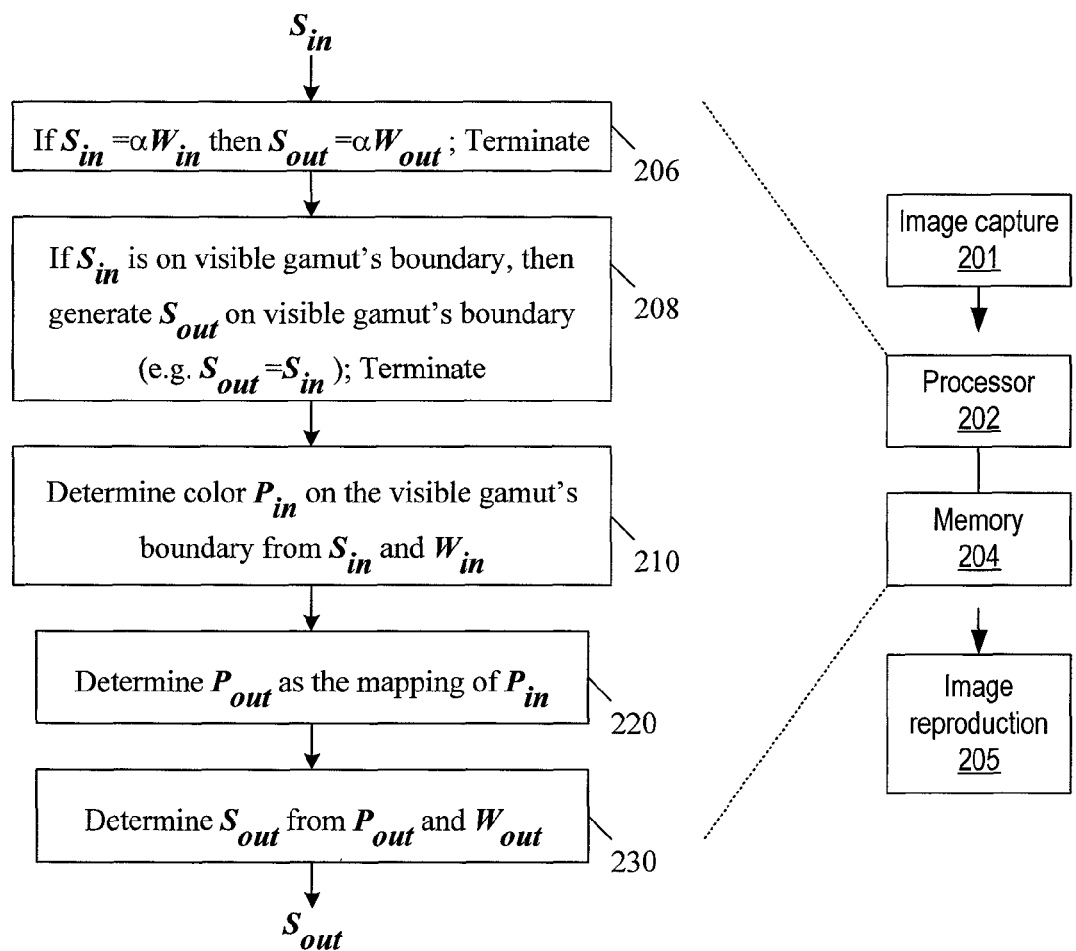
FIG. 2 shows a flowchart of a white-balancing process according to some embodiments of the present invention, and a block diagram of a computer system executing the white balancing process according to some embodiments of the present invention.

FIGS. 1 and 2 illustrate an exemplary white balancing process. Colors are shown as vectors in some color coordinate system. Visible gamut 110 is shown as a non-circular cone with a vertex O, but can be some other shape depending on the color coordinate system. Color $W_{in}$ is mapped into a white color $W_{out}$ (the term "white" includes gray colors) or into some multiple of $W_{out}$ (in a linear color coordinate system), i.e. into some color $cW_{out}$ where c is a positive constant. The color $W_{out}$ can be, for example, a standard white point (e.g. CIE $D_{50}$ or $D_{65}$) with some predefined physical luminance, but the invention is not limited to any particular $W_{out}$ definition. Non-white colors are also possible. For example, if the white balancing is performed to transform an image captured under red illumination to an image to be viewed under blue illumination, then $W_{out}$ may be bluish white.

Any given input color $S_{in}$ is mapped into a color $S_{out}$ as shown in FIG. 2. In the example of FIG. 2, the image is captured by an image capture device 201 (e.g. a digital camera, an image synthesis system in a computer, or some other device). The image is white balanced by a software-programmed computer system including one or more computer processors 202 executing computer instructions stored in a memory 204 and/or received over a network (not shown), and/or by hardwired circuitry. The white-balanced image may then be reproduced by a device 205 (e.g. a computer monitor, a printer, or some other device).

The white balancing operation includes steps 206-230. If the input color $S_{in}$ is a multiple of $W_{in}$ (in a linear color coordinate system), i.e. $S_{in}=\alpha W_{in}$ for some non-negative number $\alpha$, then $S_{out}$ is set to $\alpha W_{out}$. See step 206. The white balancing for the color $S_{in}$ can now be terminated, i.e. the subsequent steps are skipped.

If $S_{in}$ lies on the visible gamut's boundary (step 208), then $S_{out}$ is generated to be on the visible gamut's boundary, and the subsequent steps are skipped. Exemplary $S_{out}$ computations include:

$$S_{out}=S_{in} \qquad (1)$$

or $$S_{out}=S_{in}\cdot|W_{out}|/|W_{in}| \qquad (2)$$

where |•| denotes some measure of the magnitude, luminance or brightness, as discussed in more detail below.

If $S_{in}$ is neither a multiple of $W_{in}$ nor on the visible gamut's boundary, then at step 210 a color $P_{in}$ is determined on the visual gamut's boundary such that $P_{in}$ corresponds to $S_{in}$ in some predefined sense. For example, $P_{in}$ can be such that $S_{in}$ is a function of $P_{in}$ and $W_{in}$ (and possibly other parameters). In some embodiments, the function is a linear combination, i.e.:

$$S_{in}=\alpha P_{in}+\beta W_{in} \qquad (3)$$

for some coefficients $\alpha$, $\beta$ determined at step 210.

The color $P_{in}$ can be chosen in many ways. In the case of equation (3), in a linear color coordinate system, the color $P_{in}$ lies in the plane containing the vectors $W_{in}$ and $S_{in}$, and hence on the intersection of this plane with the visible gamut's boundary. If the boundary is a conical surface, the intersection may be two rays originating from the origin O. $P_{in}$ can be chosen on any of these rays. In some embodiments $P_{in}$ is chosen so that $S_{in}$ lies between $P_{in}$ and $W_{in}$ (as in FIG. 1). In particular, in some embodiments, both $\alpha$ and $\beta$ are positive. The magnitude of $P_{in}$ is unimportant since $\alpha P_{in}$ can be adjusted by the choice of $\alpha$.

Suppose that the white balancing process maps the color $P_{in}$ into some color $P_{out}$ (determined at step 220, or possibly determined at step 208 performed when white-balancing the color $P_{in}$). At step 230, $S_{out}$ is obtained as some function of $P_{out}$ and $W_{out}$ (and possibly of some other parameters). In some embodiments, the function is a linear combination:

$$S_{out}=\alpha' P_{out}+\beta' W_{out} \qquad (4)$$

where $\alpha'$ and $\beta'$ are some coefficients such that $S_{out}$ is in visible gamut 110. Of note, $S_{out}$ will be in the visible gamut if $\alpha'$ and $\beta'$ are non-negative and the visible gamut is a cone with an aperture of at most 180°.

The coefficients $\alpha'$ and $\beta'$ can be chosen in different ways. In some embodiments, each of these coefficients is a continuous function of one or both of the coefficients $\alpha$ and $\beta$. For example, $\alpha=\alpha'$ and $\beta=\beta'$. In some embodiments, $\alpha'$ and $\beta'$ are chosen so that $S_{in}$ and $S_{out}$ will have the same brightness. Brightness can be defined in different ways, e.g. as the physical luminance, the lightness in CIELUV, or the color vector's length in an orthonormal color coordinate system such as DEF. See U.S. patent application Ser. No. 11/321,443 filed Dec. 28, 2005 by S. N. Bezryadin, published as no. 2007/0146745 A1 on Jun. 28, 2007, incorporated herein by reference. In some embodiments, $\alpha'$ and $\beta'$ are chosen to preserve the brightness ratio $B(S_{out})/B(S_{in})$, where $B(\bullet)$ is the brightness function. Thus, $$B(S_{out})/B(S_{in})=B(W_{out})/B(W_{in})=\text{const.} \qquad (5)$$

In some embodiments, the brightness is preserved on the visible gamut's boundary, but is increased or decreased inside the visible gamut:

$$B(P_{out})=B(P_{in})$$

$B(S_{out})$ increases or decreases when $S_{in}$ moves from the visible gamut's boundary to $W_{in}$.

Some embodiments preserve color saturation. Saturation represents the amount of white in the color (greater saturation means less white). For input colors $S_{in}$, saturation may represent the amount of color $W_{in}$ in $S_{in}$. For output colors $S_{out}$, saturation may represent the amount of $W_{out}$. Saturation can be defined in different ways. For example, saturation of $S_{in}$ can be represented as the angle $\gamma_1$ (FIG. 1) between $S_{in}$ and $W_{in}$. Saturation of $S_{out}$ can be represented as the angle $\gamma_2$ between $S_{out}$ and $W_{out}$. In some embodiments, $S_{out}$ is chosen so that $$\gamma_2=\gamma_1 \qquad (6)$$

In particular, the color $S_{out}$ can be determined as follows:

1. At step 210, determine $P_{in}$ as some non-zero vector which, in a linear color coordinate system, lies in the intersection of (i) the plane containing the vectors $W_{in}$, $S_{in}$ and (ii) the boundary of visible gamut 110.

2. At step 220, determine $P_{out}$ as described above.

3. At step 230, in the plane containing $P_{out}$ and $W_{out}$, select the ray in the visible gamut such that the angle $\gamma_2$ between the ray and $S_{out}$ is equal to the angle $\gamma_1$ between $S_{in}$ and $W_{in}$. This ray defines the direction of $S_{out}$. The ray is chosen to lie between $P_{out}$ and $W_{out}$.

4. Finally, at step 230, determine the magnitude $|S_{out}|$ of the vector $S_{out}$ in some suitable way, for example to preserve the magnitude ratio, i.e.:

$$|S_{out}|=|S_{in}|\cdot|W_{out}|/|W_{in}| \qquad (7)$$

If the magnitude is the brightness, then the brightness ratio will be preserved as in (5).

In some embodiments, equation (6) is replaced with preserving the saturation ratio:

$$C(S_{in})/C(P_{in})=C(S_{out})/C(P_{out}) \qquad (8)$$

where $C(\bullet)$ is saturation (which can be defined with reference to $W_{in}$ for input colors and with reference to $W_{out}$ for output colors). Denote $\phi_1=\sphericalangle(S_{in},P_{in})$, i.e. the angle between $S_{in}$ and $P_{in}$, and $\phi_2=\sphericalangle(S_{out},P_{out})$. If the saturation is defined using angles as for (6), then (8) can be implemented as:

$$\gamma_1/(\gamma_1+\phi_1)=\gamma_2/(\gamma_2+\phi_2) \qquad (9)$$

Equation (9) uniquely defines $\gamma_2$ because the sum $\gamma_2+\phi_2=\sphericalangle(P_{out},W_{out})$ is uniquely defined by $P_{out}$ and $W_{out}$. Thus, at step 230, $\gamma_2$ is determined as:

$$\gamma_2=\gamma_1/(\gamma_1+\phi_1)\cdot(\gamma_2+\phi_2) \qquad (10)$$

Some embodiments use the equations (8)-(10) for small values of $\gamma_1$ (e.g. $\gamma_1<0/1$ radians), but use some other equation (e.g. a polynomial in $\gamma_1$ of a degree greater than 1) for larger values of $\gamma_1$. In some embodiments, $\gamma_2$ is a continuous and/or monotonic function of $\gamma_1$.

Figure 3:
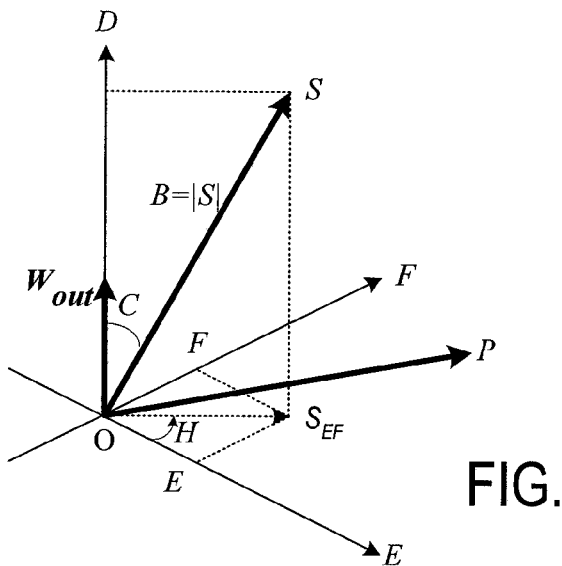
FIGS. 3 and 4 illustrate color vectors and color coordinate systems used in some embodiments of the present invention.

Computational complexity of the white balancing process may depend on the color representation. Some representations use a linear color coordinate system such that $W_{out}$ lies on one of the coordinate axes. For example, if $W_{out}$ is a $D_{65}$ white point, a suitable color coordinate system is the orthonormal system DEF described in the aforementioned U.S. patent application Ser. No. 11/321,443 and illustrated in FIG. 3. Briefly, DEF is a linear transformation of the 1931 CIE XYZ color coordinate system for the 2° field:

$$\begin{bmatrix} D \\ E \\ F \end{bmatrix} = A_{XYZ-DEF} \begin{bmatrix} X \\ Y \\ Z \end{bmatrix} \quad (11)$$

where:

$$A_{XYZ-DEF} = \begin{bmatrix} 0.205306 & 0.712507 & 0.467031 \\ 1.853667 & -1.279659 & -0.442859 \\ -0.365451 & 1.011998 & -0.610425 \end{bmatrix} \quad (12)$$

The DEF system is orthonormal in the sense that its color matching functions $\bar{d}(\lambda), \bar{e}(\lambda), \bar{f}(\lambda)$ form an orthonormal system in $L^2$:

$$\int \bar{d}(\lambda)\bar{e}(\lambda)d\lambda = \int \bar{d}(\lambda)\bar{f}(\lambda)d\lambda = \int \bar{e}(\lambda)\bar{f}(\lambda)d\lambda = 0 \quad (13)$$

$$\int [\bar{d}(\lambda)]^2 d\lambda = \int [\bar{e}(\lambda)]^2 d\lambda = \int [\bar{f}(\lambda)]^2 d\lambda = K$$

where K is a positive constant defined by the measurement units. The integrals are taken over the visible range of wavelengths $\lambda$.

The D axis (D>0 and E=F=0) corresponds to the CIE $D_{65}$ white color standard. ($D_{65}$ defines the chromaticity coordinates only.) For red colors produced by a monochromatic radiation with $\lambda$=700 nm, the coordinate F=0 and E>0. The visible spectrum is a non-circular cone extending upward from the vertex at the origin O (the origin is the black color).

Some embodiments use the spherical coordinate system BCH (Brightness, Chroma, Hue) based on DEF and described in the aforementioned U.S. patent application Ser. No. 11/321,443. For a color S with DEF coordinates (D,E,F), the BCH coordinates are:

$$B = |S| = \sqrt{D^2 + E^2 + F^2} \quad (14)$$

C ("chroma") is the angle between the color S and the D axis;

H ("hue") is the angle between (i) the orthogonal projection $S_{EF}$ of the vector S on the EF plane and (ii) the E axis.

For illustration, suppose that white balancing needs to be performed in the BCH coordinates so as to preserve the saturation ratio as in (9) and also preserve either the brightness B defined by (14) or the brightness ratio $|S_{out}|/|S_{in}|$. Suppose further that $P_{out} = P_{in}$ at step 208 (FIG. 2). Denote the BCH coordinates of $S_{in}$ as $(B_{in}, C_{in}, H_{in})$, and the BCH coordinates of $S_{out}$ as $(B_{out}, C_{out}, H_{out})$. Denote further $P = P_{in}$, and the BCH coordinates of P as $(B_P, C_P, H_P)$. At step 230, $B_{out}$, $C_{out}$, $H_{out}$ are computed as follows:

$$B_{out} = B_{in} \quad (15)$$

to preserve the brightness, or $$B_{out} = B_{in} \cdot |W_{out}|/|W_{in}| \quad (16)$$

to preserve the brightness ratio. Further (see (10)):

$$C_{out} = C_P \cdot \gamma_1 / (\gamma_1 + \phi_1) \quad (17)$$

$$H_{out} = H_P \quad (18)$$

In some embodiments, $H_{out}$ is set to $H_{in}$.

Figure 4:
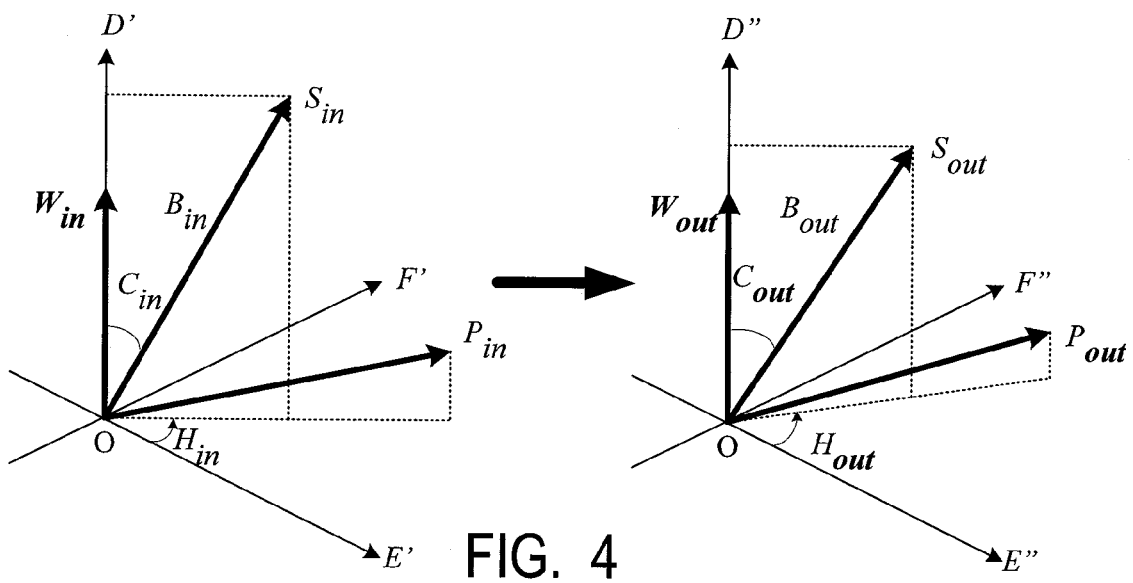
Figure 5:
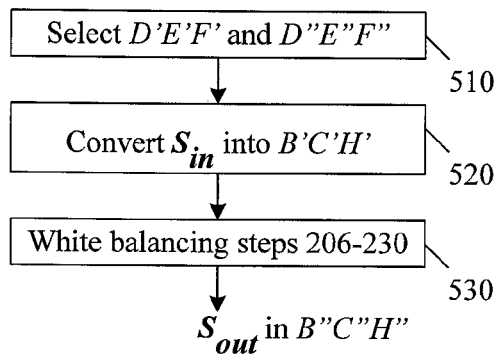
FIG. 5 shows a flowchart of a white-balancing process according to some embodiments of the present invention.

FIGS. 4, 5 illustrate an embodiment which uses two possibly orthonormal coordinate systems: D'E'F' for the input colors and D"E"F" for the output colors. D'E'F' is chosen so that the color $W_{in}$ lies on one of the coordinate axes—the D' axis. D"E"F" is chosen so that the color $W_{out}$ lies on one of the coordinate axes—the D" axis. In some embodiments, D"E"F" is a linear transform (e.g. a rotation) of D'E'F'. In some embodiments, each of the two coordinate systems is a linear transform (e.g. a rotation) of DEF. One of D'E'F', D"E"F" may be DEF.

The white balancing uses the spherical coordinate systems B'C'H' and B"C"H" defined for D'E'F' and D"E"F" respectively as in (14).

At step 510 (FIG. 5), the white-balancing system (e.g. a computer system as in FIG. 2) obtains the vectors $W_{in}$, $W_{out}$ in some color coordinate system, and selects the coordinate systems D'E'F', D"E"F" as described above. At step 520, the input colors $S_{in}$ are converted into the B'C'H' coordinates if needed (i.e. if the input data are initially in some other coordinate system). At step 530, the white-balancing steps 206-230 of FIG. 2 are performed, for example, as follows.

Let us denote $P_{in} = (B_{P_{in}}, C_{P_{in}}, H_{P_{in}})$ in B'C'H', and $P_{out} = (B_{P_{out}}, C_{P_{out}}, H_{P_{out}})$ in B"C"H". As seen in the D'E'F' diagram in FIG. 4, if $P_{in}$ is in the plane containing $S_{in}$ and $W_{in}$, then $H_{P_{in}} = H_{in}$, so determining $P_{in}$ is facilitated at step 210. In some embodiments, the computer system sets $C_{P_{in}} = C'_{max}(H_{in})$, defined as the maximum C' value in the visible gamut for the fixed hue $H' = H_{in}$. The value $B_{P_{in}}$ is unimportant, and can be determined in any suitable way, for example as $B_{P_{in}} = 1$, or $B_{P_{in}} = B_{in}$, or $B_{P_{in}} = |W_{in}|$.

At step 220, if $P_{out} = P_{in}$, then the $P_{out}$ coordinates $(B_{P_{out}}, C_{P_{out}}, H_{P_{out}})$ in B"C"H" can be computed as a linear transform of $(B_{P_{in}}, C_{P_{in}}, H_{P_{in}})$. Full linear transform computation can be omitted. Indeed, $B_{P_{out}}$ can be set to any suitable value as described above, e.g. $B_{P_{out}} = B_{P_{in}}$. Also, once $H_{P_{out}}$ has been computed (as a linear transform or in some other way), then $C_{P_{out}}$ can be computed as $C"_{max}(H_{P_{out}})$. In some embodiments, $H_{P_{out}}$ is set to $H_{P_{in}}$ to simplify the computations. Other computational algorithms are also possible.

At step 230, $S_{out}$ can be computed using any of the techniques described above in connection with FIGS. 1-3, or using some other techniques. For example, $H_{out}$ can be set to $H_{P_{out}}$. $B_{out}$ can be computed using any of the techniques described above, e.g. $B_{out} = B_{in} \cdot |W_{out}|/|W_{in}|$. $C_{out}$ can also be computed using any of the techniques described above, for example, $$C_{out} = C_{P_{out}} \cdot C_{in} / C_{P_{in}} \quad (19.1)$$

or $$C_{out} = C_{in} \quad (19.2)$$

or using the equation (19.2) for small $C_{in}$ values (e.g. $C_{in} < 0.1$ radians) but using some other equation (e.g. polynomial of a degree greater than one) for larger $C_{in}$ values.

The invention includes a machine-implemented (e.g. computer-implemented) method for white-balancing a digital image using a mapping that maps digital colors into digital colors, the method comprising obtaining information on a value $W_{out}$ of said mapping on each of one or more reference colors $W_{in}$. Each color $W_{in}$ is in a visible gamut but not on the visible gamut's boundary.

For at least one color $S_{in}$ in the digital image such that $S_{in}$ is not a multiple of any one of said one or more reference colors $W_{in}$ and is not on the visible gamut's boundary, the method comprises determining a value $S_{out}$ of said mapping on the color $S_{in}$, wherein determining $S_{out}$ comprises: determining one or more colors $P_{in}$ on the visible gamut's boundary from the color $S_{in}$; and determining the value $S_{out}$ from (i) one or more of said values of the mapping on the one or more reference colors, and (ii) a value of said mapping on each of the one or more colors $P_{in}$.

In some embodiments, the mapping maps the visible gamut's boundary into itself. Thus, each $P_{out}$ is in the visible gamut's boundary. This is not necessary however. In some embodiments, each color on the visible gamut's boundary is mapped into itself under said mapping (i.e. the mapping is the identity mapping on the visible gamut's boundary).

In some embodiments, for each non-black color $S_{in}$, a ratio of a length of $S_{out}$ to a length of $S_{in}$ is independent of $S_{in}$, the length being a vector length in a predefined color coordinate system. In some embodiments, the predefined color coordinate system is 10%-orthonormal, or orthonormal.

In some embodiments, each reference color $W_{in}$ is perceived as white by a human being under predefined viewing conditions. In some embodiments, each color $W_{out}$ is perceived as white by a human being under predefined viewing conditions. For example, if the viewing conditions include a blue lamp, $W_{out}$ could be bluish white assuming that humans would adapt to the blue lamp and would perceive bluish white as white.

The invention includes computer systems programmed to perform the white balancing methods discussed above. The invention includes computer-readable media (disks, tapes, semiconductor memories, and possibly others) comprising a computer program for causing a computer system to perform the white balancing methods described above. The invention covers downloading such computer programs over a network and in particular covers network transmission methods comprising transmission of such computer programs over a network.

The invention is not limited to the embodiments described above, and in particular to any computations or color coordinate systems. Other embodiments and variations are within the scope of the invention, as defined by the appended claims.

The invention claimed is:

1. A machine-implemented method for white-balancing a digital image using a mapping that maps digital colors into digital colors, the method comprising:
    obtaining, by the machine, information on a value $W_{out}$ of the mapping on a reference digital color $W_{in}$ lying in a visible gamut but not on the visible gamut's boundary, the mapping of $W_{in}$ into $W_{out}$ being to adapt $W_{in}$ to viewing conditions different from those in the image, wherein the mapping maps digital colors into digital colors and therefore each value of the mapping (including the value $W_{out}$) is a digital color;
    for at least one digital color $S_{in}$ in the digital image such that $S_{in}$ is not a multiple of the reference digital color $W_{in}$ and is not on the visible gamut's boundary, determining, by the machine, a value $S_{out}$ of said mapping on the digital color $S_{in}$, wherein determining $S_{out}$ comprises:
    determining, by the machine, a digital color $P_{in}$ on the visible gamut's boundary from the digital color $S_{in}$; and
    determining, by the machine, the value $S_{out}$ from said information on the value $W_{out}$ and from a value $P_{out}$ of said mapping on the digital color $P_{in}$.

2. The method of claim 1 wherein said mapping maps the visible gamut's boundary into itself.

3. The method of claim 1 wherein each color on the visible gamut's boundary is mapped into itself under said mapping.

4. The method of claim 1 wherein the color $P_{in}$ is a linear combination of the color $S_{in}$ and the reference color $W_{in}$.

5. The method of claim 1 wherein in a linear color coordinate system, the color $P_{in}$ lies in a plane containing the reference color $W_{in}$ and the color $S_{in}$.

6. The method of claim 1 wherein the color $S_{out}$ is a linear combination of the color $W_{out}$ and the value $P_{out}$.

7. The method of claim 1 wherein in a linear color coordinate system, the color $S_{out}$ lies in a plane containing the color $W_{out}$ and the value $P_{out}$.

8. The method of claim 1 wherein for each non-black color, a ratio of a length of a value of said mapping on the non-black color to a length of the non-black color is independent of the non-black color, the length being a vector length in a predefined color coordinate system.

9. The method of claim 8 wherein the predefined color coordinate system is orthonormal.

10. The method of claim 1 wherein the reference color $W_{in}$ is perceived as white by a human being under predefined viewing conditions.

11. The method of claim 1 wherein $W_{out}$ is perceived as white by a human being under predefined viewing conditions.

12. The method of claim 1 wherein the mapping maps coordinates of $S_{in}$ in a first color coordinate system into coordinates of $S_{out}$ in a second color coordinate system different from the first color coordinate system.

13. A computer system programmed to perform the method of claim 1.

14. Non-transitory computer-readable media comprising a computer program for causing a computer system to perform the method of claim 1.

15. A network transmission method comprising transmitting a computer program comprising one or more computer instructions over a network for downloading each instruction into a non-transitory storage of a computer system, the computer program being for causing the computer system to perform the method of claim 1.

16. Non-transitory computer-readable media comprising a computer program for causing a computer system to perform the method of claim 2.

17. A network transmission method comprising transmitting a computer program comprising one or more computer instructions over a network for downloading each instruction into a non-transitory storage of a computer system, the computer program being for causing the computer system to perform the method of claim 2.

18. Non-transitory computer-readable media comprising a computer program for causing a computer system to perform the method of claim 3.

19. A network transmission method comprising transmitting a computer program comprising one or more computer instructions over a network for downloading each instruction into a non-transitory storage of a computer system, the computer program being for causing the computer system to perform the method of claim 3.

20. Non-transitory computer-readable media comprising a computer program for causing a computer system to perform the method of claim 4.

21. A machine-implemented method for white-balancing a digital image using a mapping that maps digital colors into digital colors to adapt at least one digital color in the digital image to viewing conditions different from those in the digital image, the method comprising, for each digital color $S_{in}$ in the digital image, determining, by a machine, a value of said mapping on the digital color $S_{in}$, wherein:
    said mapping maps each digital color $S_{in}$ on a visible gamut's boundary into the visible gamut's boundary;
    said mapping maps at least one digital color $S_{in}$ which is not on the visible gamut's boundary into a digital color different from $S_{in}$ and not on the visible gamut's boundary to adapt the digital color $S_{in}$ to said viewing conditions.

22. The method of claim 21 wherein said mapping maps each color $S_{in}$ on the visible gamut's boundary into itself.

23. The method of claim 21 wherein said mapping maps each color $S_{in}$ in the visible gamut but not on the visible gamut's boundary into a color in the visible gamut but not on the visible gamut's boundary.

24. A computer system programmed to perform the method of claim 21.

25. Non-transitory computer-readable media comprising a computer program for causing a computer system to perform the method of claim 21.

26. A network transmission method comprising transmitting a computer program comprising one or more computer instructions over a network for downloading each instruction into a non-transitory storage of a computer system, the computer program being for causing the computer system to perform the method of claim 21.

27. A computer system programmed to perform the method of claim 22.

28. Non-transitory computer-readable media comprising a computer program for causing a computer system to perform the method of claim 23.

29. A network transmission method comprising transmitting a computer program comprising one or more computer instructions over a network for downloading each instruction into a non-transitory storage of a computer system, the computer program being for causing the computer system to perform the method of claim 23.

* * * * *